United States Patent
Ozugur et al.

(10) Patent No.: US 7,171,120 B2
(45) Date of Patent: Jan. 30, 2007

(54) OPTICAL SWITCH CONTROLLER FOR FAIR AND EFFECTIVE LIGHTPATH RESERVATION IN AN OPTICAL NETWORK

(75) Inventors: Timucin Ozugur, Garland, TX (US); Dominique Verchere, Plano, TX (US)

(73) Assignee: Alcatel, Paris (FR)

( * ) Notice: Subject to any disclaimer, the term of this patent is extended or adjusted under 35 U.S.C. 154(b) by 962 days.

(21) Appl. No.: 10/163,962

(22) Filed: Jun. 5, 2002

(65) Prior Publication Data

US 2004/0247315 A1   Dec. 9, 2004

(51) Int. Cl.
H04B 10/00   (2006.01)
(52) U.S. Cl. .......................................... 398/51; 398/45
(58) Field of Classification Search ............. 398/45–54
See application file for complete search history.

(56) References Cited

U.S. PATENT DOCUMENTS 6,600,581 B1 *   7/2003   Fatehi et al. ................... 398/9
2002/0186689 A1 *   12/2002   Miyabe ...................... 370/355

* cited by examiner

Primary Examiner—Agustin Bello
(74) Attorney, Agent, or Firm—Danamraj & Youst, P.C.; Jessica W. Smith; V. Lawrence Sewell

(57) ABSTRACT

An optical switch controller ("OSC") and method for use in a Generalized Multi-Protocol Label Switching ("GMPLS") network is described. A Used Pool ("UP"), an Available Pool ("AP"), and a Flagged Pool ("FP") are maintained at the OSC. The FP includes wavelengths that have been suggested but not yet reserved by a lightpath. The UP includes wavelengths that are currently being used by LSPs. The AP includes wavelengths not included in the UP or the FP. Each wavelength included in the FP includes a time stamp. At each node along the path during lightpath establishment, for each wavelength of the Label Set, if the wavelength is an element of the node's UP, the wavelength is extracted from the Label Set. If the wavelength is an element of the node's FP, a determination is made whether the local clock time minus the time stamp for the wavelength is less than a first threshold. If so, the wavelength is extracted from the Label Set; otherwise, the wavelength is extracted from the Label Set and included in a Flagged Set. For each wavelength of the FP, upon expiration of the time stamp, the wavelength is returned to the AP.

22 Claims, 4 Drawing Sheets

OPTICAL SWITCH CONTROLLER FOR FAIR AND EFFECTIVE LIGHTPATH RESERVATION IN AN OPTICAL NETWORK

BACKGROUND OF THE INVENTION

1. Technical Field of the Invention

The present invention generally relates to optical networks. More particularly, and not by way of any limitation, the present invention is directed to an optical switch controller for application in a Generalized Multi-Protocol Label Switching ("GMPLS") network for facilitating fair and effective reservation of lightpaths therein.

2. Description of Related Art

In all-optical GMPLS wavelength division multiplex ("WDM") networks, lightpaths, or label switch paths ("LSPs"), may collide and fail during the lightpath establishment procedure. This is referred to as the wavelength collision problem. Shorter lightpaths have an advantage over longer lightpaths in reserving wavelengths. FIG. 1, which depicts a block diagram of an optical network 100, illustrates why this is the case.

In particular, assuming for the sake of example that an LSP Request 1 requesting establishment of a first lightpath 102 between a source node 103a and a destination node 103b, and an LSP Request 2 requesting establishment of a second lightpath 104 between a source node 105a and a destination node 105b, are from their respective source nodes along their respective paths at the same time. Because the lightpath 104 is shorter, LSP Request 2 will be received at the destination node 105b before LSP Request 1 is received at the destination node 103b. Consequently, the lightpath 104 will be established first.

This may also be the case in a situation where the LSP Request 1 is issued before the LSP Request 2, given that lightpath 102 is significantly shorter than lightpath 104. If both lightpaths 102, 104 reserve the same wavelength, a collision will occur at the node 105b and appropriate error messages will be sent to nodes 103a and 103b, indicating that a different wavelength must be reserved for the lightpath 102.

In existing protocols for lightpath reservation in GMPLS, an optical switch controller ("OSC") at each node in an optical network maintains two "pools" of wavelengths, including an "Available Pool" ("AP") and a "Used Pool" ("UP"). The AP includes wavelengths that available to be reserved by a lightpath. The UP comprises wavelengths that are currently being used by existing lightpaths.

Currently, in the GMPLS signaling control plane (RSVP/LDP/CR-LDP), upstream nodes insert a "Label Set" object into each LSP Request (e.g., Path) message. The Label Set object suggests the labels (which correspond directly to wavelengths in the optical domain) that can be selected by the downstream nodes. In other words, the Label Set represents the wavelengths available for selection as indicated in the AP. Downstream nodes select one of the labels, or wavelengths, in the Label Set as specified in the Label Set object.

In general, at each node along the path during LSP establishment, the OSC at the node compares the wavelengths of the Label Set object with those in its UP and removes from the Label Set object any common wavelengths. Similarly, once a wavelength has been reserved by a lightpath, the reserved wavelength is removed from the AP and included in the UP maintained by each node along the path.

While the above-described technique certainly addresses the wavelength continuity problem, it fails to adequately address the short lightpath/long lightpath disparity described above with reference to FIG. 1. Moreover, it fails to solve the wavelength collision. In particular, it does not prevent the suggestion of the same wavelengths to, and the possible selection of the same wavelength by, more than one LSP. For example, referring again to FIG. 1, assuming LSP Request 1 is issued at a time t1 and LSP Request 2 is issued at a time t2 after time t1. Assuming further that LSP Request 2 is received at the node 105b at a time t3 and LSP Request 1 is received at the node 103b at a time t4 after time t3. If LSP Request 1 is received at the node 105b any time before time t3, the wavelength that will ultimately be assigned to the lightpath 104 will still be in the AP at that node; therefore, it is conceivable that the same wavelength will be assigned to both paths 102 and 104. Accordingly, as indicated above, the current protocols do not adequately address the wavelength collision problem.

Wavelength conversion may eliminate the wavelength collision problem; however, wavelength converters are expensive, rendering it impractical to include such equipment at every node in a network.

SUMMARY OF THE INVENTION

The present invention comprises an optical switch controller ("OSC") for application in a Generalized Multi-Protocol Label Switching ("GMPLS") network for facilitating fair and effective reservation of lightpaths therein. In accordance with features of one embodiment, in addition to the UP and AP maintained at each node, an additional pool, designated a "Flagged Pool" ("FP"), is also maintained. The FP includes wavelengths that have been suggested but not yet reserved by a lightpath. As previously described, the UP includes wavelengths that are currently being used by LSPs. The AP includes wavelengths not included in the UP or the FP. Each wavelength included in the FP includes a time stamp indicating the local time at which the wavelength was suggested.

At each node along the path during LSP establishment, a determination is made with respect to each wavelength of the Label Set object included in the Label Request (e.g., Path) message whether the wavelength is an element of the AP of the node. If not, a determination is made whether the wavelength is an element of the FP of the node. If the wavelength is an element of neither the AP nor the FP, and hence is an element of the UP, the wavelength is extracted from the Label Set. If the wavelength is an element of the FP, a determination is made whether the local clock time minus the time stamp for the wavelength is less than a first threshold. If so, the wavelength is extracted from the Label Set; otherwise, a Flagged Set is created (if not already existent) and the wavelength is extracted from the Label Set and placed in the Flagged Set.

For each wavelength of the FP, upon expiration of a predetermined time period without the wavelength being reserved, the wavelength is returned to the AP.

In one aspect, the invention comprises a method of implementing an optical switch controller ("OSC") at a node of an optical network comprising the steps of, responsive to receipt at the node of a Label Request message identifying a Label Set comprising a plurality of wavelengths, for each wavelength of the Label Set: (1) determining whether the wavelength is an element of an Available Pool ("AP") of the OSC; (2) responsive to a determination that the wavelength is not an element of the AP, determining whether the wavelength is an element of a Flagged Pool ("FP") of the OSC; (3) responsive to a determination that the wavelength is not an element of the FP, updating the Label Request message by removing the wavelength from the Label Set; (4) responsive to a determination that the wavelength is an element of the FP, determining whether a local clock time at the node minus a time stamp associated with the wavelength in the FP is less than a short threshold; (5) responsive to a determination that the local clock time at the node minus the time stamp associated with the wavelength is shorter than a short threshold, updating the Label Request message by removing the wavelength from the Label Set; and (6) responsive to a determination that the local clock time at the node minus the time stamp associated with the wavelength is not shorter than a short threshold, updating the Label Request message by removing the wavelength from the Label Set and including the wavelength in a Flagged Set identified in the Label Request message.

In another aspect, the invention comprises an optical switch controller ("OSC") in a node of an optical network comprising a Used Pool ("UP") comprising a list of wavelengths currently in use for existing optical paths through the node, a Flagged Pool ("FP") identifying wavelengths proposed for new optical paths to be established through the node and including for each identified wavelength a time stamp indicating when the wavelength was proposed, and an Available Pool ("AP") identifying wavelengths that are not elements of the UP or the FP.

In another aspect, the invention comprises an optical switch controller ("OSC") at a node of an optical network comprising means responsive to receipt at the node of a Label Request message identifying a Label Set for determining whether a wavelength of the Label Set is an element of an Available Pool ("AP") of the OSC, means responsive to a determination that the wavelength is not an element of the AP for determining whether the wavelength is an element of a Flagged Pool ("FP") of the OSC, means responsive to a determination that the wavelength is not an element of the FP for updating the Label Request message by removing the wavelength from the Label Set, means responsive to a determination that the wavelength is an element of the FP for determining whether a local clock time at the node minus a time stamp associated with the wavelength in the FP is less than a short threshold, means responsive to a determination that the local clock time at the node minus the time stamp associated with the wavelength is shorter than a short threshold for updating the Label Request message by removing the wavelength from the Label Set, and means responsive to a determination that the local clock time at the node minus the time stamp associated with the wavelength is not shorter than a short threshold for updating the Label Request message by removing the wavelength from the Label Set and including the wavelength in a Flagged Set identified in the Label Request message.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
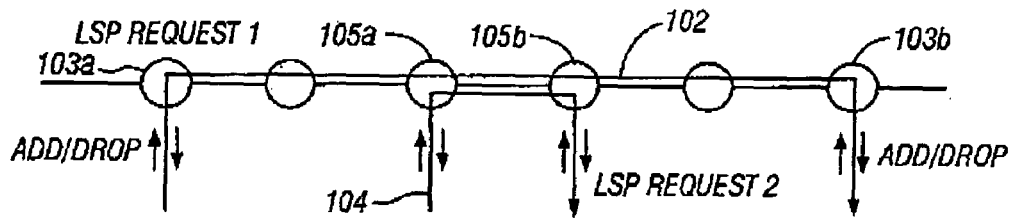
FIG. 1 is a system block diagram illustrating a wavelength collision problem inherent in prior art methods of assigning a wavelength to a flow in an optical network.

In the drawings, like or similar elements are designated with identical reference numerals throughout the several views thereof, and the various elements depicted are not necessarily drawn to scale.

Figure 2:
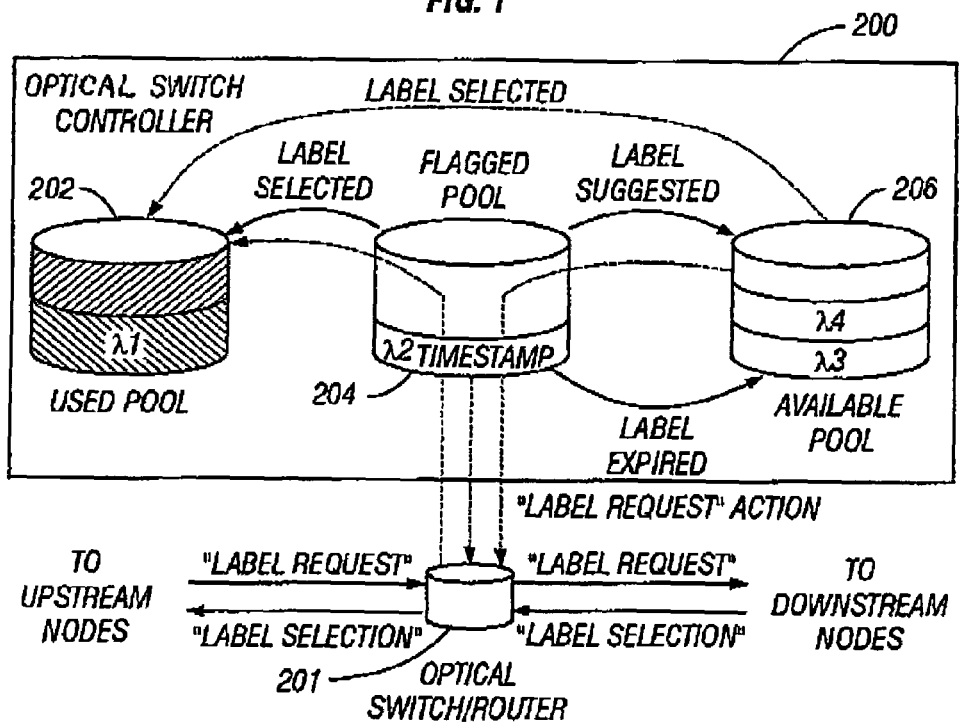
FIG. 2 is a system block diagram of an optical switch controller ("OSC") in accordance with one embodiment of the present invention.

FIG. 2 is a block diagram of an OSC 200 in accordance with one embodiment of the present invention. The OSC 200, which is located at an optical switch/router, or node, 201, of an optical network, includes three pools; specifically, a Used Pool ("UP") 202, a Flagged Pool ("FP") 204, and an Available Pool ("AP") 206. It will be recognized that the UP, FP, and AP are stored as tables in a database of the OSC 200.

As will be recognized by one of ordinary skill in the art, and as partially illustrated in FIG. 2, during establishment of an LSP, a Label Request message, such as an RSVP Path message, that includes a Label Set object suggesting wavelengths that may be reserved for use by the LSP, from a source node (not shown) is forwarded to the node 201 from an upstream node (not shown) and subsequently forwarded to a downstream node (not shown). This process continues until the Label Request message reaches a destination node (not shown), which selects a wavelength from the Label Set. A Label Selection message, such as an RSVP Resv message, that identifies the selected wavelength that has been reserved for the LSP, from the destination node is forwarded from the downstream node to the node 201 and from the node 201 to the upstream node and back to the source node (not shown) to complete the LSP establishment process.

As previously described, the UP 202 includes the wavelengths that are currently being used by existing LSPs that include the node 201. The FP 204 includes wavelengths that have been suggested but not yet reserved. The AP 206 includes all of the remaining wavelengths. In the example illustrated in FIG. 2, the UP 202 includes one wavelength $\lambda 1$, the FP 204 includes one wavelength $\lambda 2$, and the AP 206 includes two wavelengths $\lambda 3$ and $\lambda 4$.

The FP 204 includes a time stamp for each wavelength indicating when the wavelength was last suggested; i.e., included in a Label Set object. For each wavelength of the FP 204, upon expiration of a predetermined Expiration Threshold ("ET") without the wavelength being selected, as determined by taking the local clock time less the time stamp for the wavelength, the wavelength is moved from the FP 204 to the AP 206. The ET can be adaptive or dynamic and selected to be the maximum or average LSP set up time. The ET may be established and maintained on a node-by-node basis; therefore, the ET at the node 201 may be different than the ET at other nodes. Because the local clock time at the node is used in preparing the time stamp and subsequently determining whether the ET has expired, no synchronization among nodes is necessary.

Figure 3:
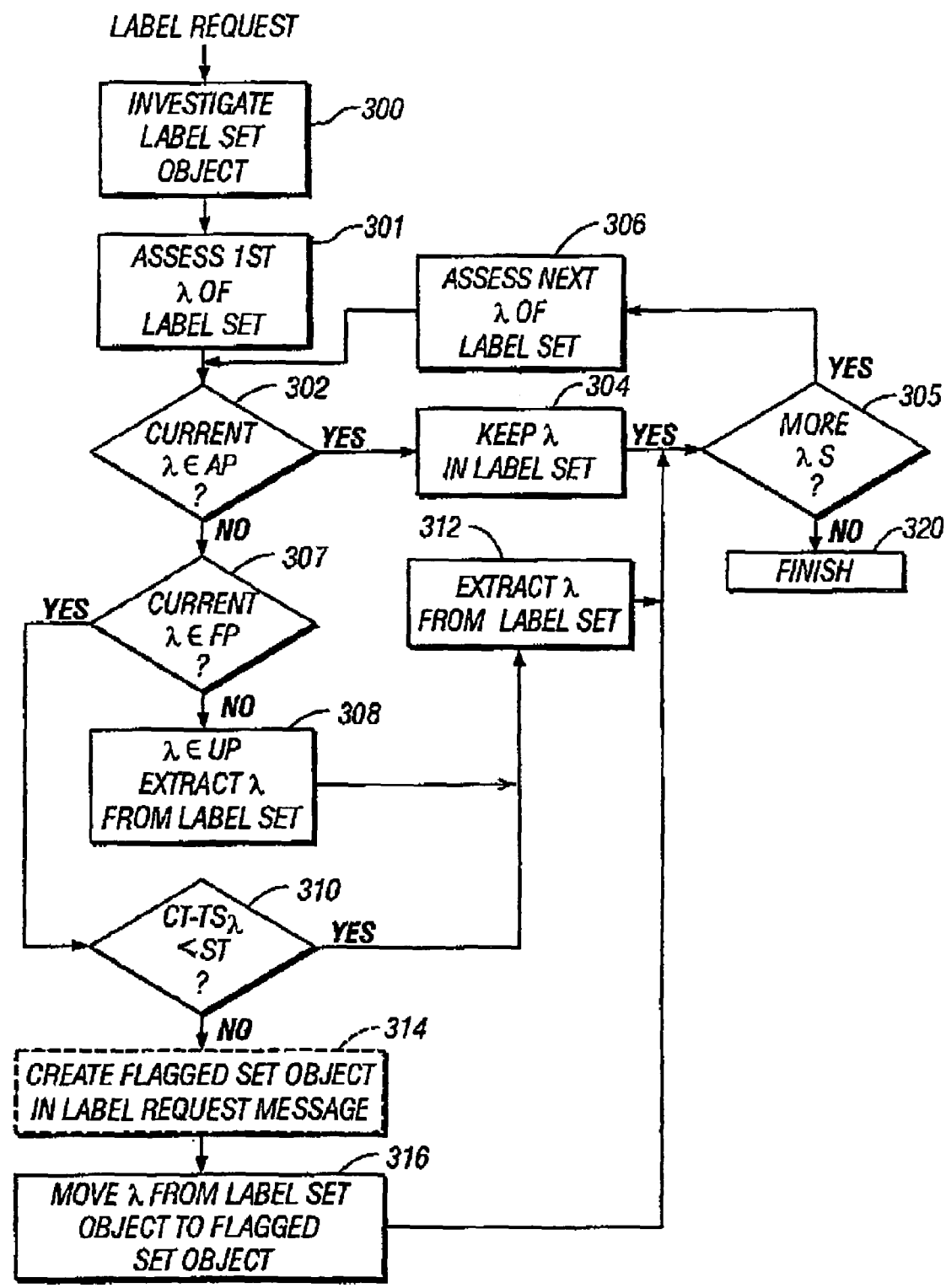
FIG. 3 is a flowchart illustrating operation of the OSC of FIG. 2 in accordance with one embodiment of the present invention.

FIG. 3 is a flowchart of the operation of one embodiment of the present invention. In step 300, when a Label Request signaling message arrives at a node, the OSC at the node investigates the Label Set object thereof. In step 301, the first wavelength of the Label Set object is accessed. In step 302, a determination is made whether the wavelength is an element of the AP of the OSC. If so, execution proceeds to step 304, in which the wavelength is retained within the Label Set of the Label Set object and execution proceeds to step 305, in which the a determination is made whether there are any more wavelengths in the Label Set object. If so, execution proceeds to step 306, in which the next wavelength is accessed, and then returns to step 302.

If in step 302 it is determined that the wavelength is not an element of the AP, execution proceeds to step 307, in which a determination is made whether the wavelength is an element of the FP. If not, execution proceeds to step 308, in which the wavelength is deemed to be an element of the UP and hence is extracted from the Label Set. If it is determined that the wavelength is an element of the FP, execution proceeds to step 310, in which a determination is made whether the clock time at the node minus the time stamp for the wavelength ("CT−$TS_\lambda$") is less than a short threshold ("ST"). If so, indicating that the wavelength was fairly recently suggested, execution proceeds to step 312, in which the wavelength is extracted from the Label Set; otherwise, execution proceeds to step 314. In step 314, a Flagged Set object, if not already existent, is created within the Label Request message. In step 316, the wavelength is extracted from the Label Set and included in the Flagged Set of the Flagged Set object. Execution then returns to step 305.

If in step 305 it is determined that there are no more wavelengths in the Label Set object, execution proceeds to step 320, in which the reservation procedure is finished for the node.

In an alternative embodiment, more than one Flagged Set, and corresponding Flagged Set objects, may be employed. Assuming that N Flagged Sets are created, a different one of N time intervals will be assigned to each of the Flagged Sets. Accordingly, each Flagged Set will include each wavelength for which the current clock time ("CT") minus the time stamp of the wavelength ("$TS_\lambda$") falls within the time interval assigned to the Flagged Set.

In particular, in a situation where there are N Flagged Sets, the time interval assigned to an nth Flagged Set, for n=1 to N is:

$$ET-((n-1)((ET-ST)/N)) < CT-TS_\lambda < ET-(n((ET-ST)/N))$$

where N is the number of Flagged Sets, ET is the Expiration Threshold at the node, ST is the Short Threshold at the node, CT is the current clock time at the node, and $TS_\lambda$ is the time stamp of the wavelength at the node. The Flagged Sets are prioritized with reference to the time interval assigned thereto, with the Flagged Set whose time interval is closest to ET being the highest priority and the Flagged Set whose time interval is closest to ST being the lowest priority. In other words, the Flagged Sets are prioritized in order of decreasing n; as n increases, priority decreases.

For example, assuming ET is equal to 8 seconds, ST is equal to 4 seconds and N equals 2, then a first Flagged Set (n=1) will include all wavelengths for which the current clock time at the node minus the time stamp of the wavelength (CT−$TS_\lambda$) is between 8 seconds and 6 seconds and a second Flagged Set (n=2) will include all wavelengths for which (CT−$TS_\lambda$) is between 6 seconds and 4 seconds.

It should be noted that, regardless of the number of Flagged Sets that are implemented, a similar process as that described above in connection with the Label Set (as illustrated in FIG. 3) will be performed for each of the Flagged Sets in decreasing order of priority. In particular, starting with the highest priority Flagged Set (e.g., Flagged Set-1), each wavelength will be analyzed as described above with reference to wavelengths of the Label Set, with the wavelength being removed from the Flagged Set if the wavelength is an element of the UP and being moved to a lower priority Flagged Set (e.g., Flagged Set-2) if the wavelength is an element of the FP and the (CT−$TS_\lambda$) for the wavelengths falls into the time interval assigned to the lower priority Flagged Set.

Figure 4:
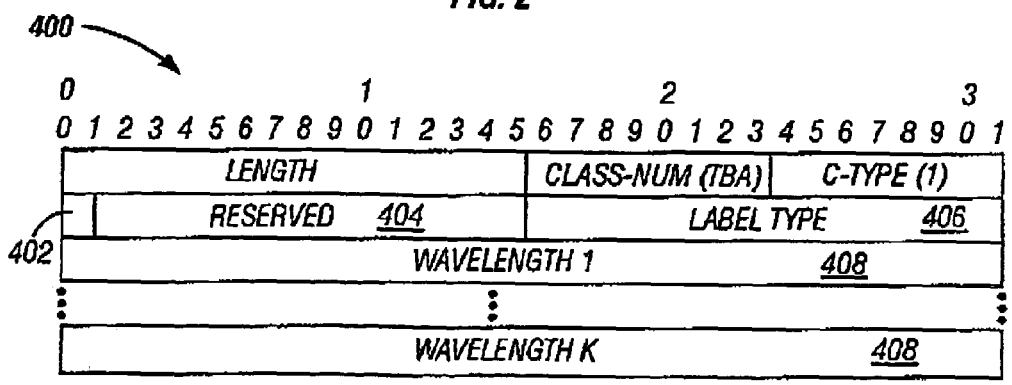
FIG. 4 depicts the format of a Flagged Set object for use in connection with one embodiment of the present invention.

FIG. 4 illustrates the format of an exemplary Flagged Set object 400 in accordance with one embodiment. It will be recognized by those of ordinary skill in the art that the format of the Flagged Set object 400 is similar to that of the Label Set object (not shown). An Action field 402 is one bit in length. A Reserved field 404 is currently not used and is 15 bits in length. A Label Type field 406 is two bytes in length. Specific wavelengths can be added to the Flagged Set by placing a 0 in the Action field 402. A range of wavelengths can be added to the Flagged Set by placing a 1 in the Action field 402. The absence of any wavelengths in wavelength fields 408 implies that there is no critically-suggested wavelengths. The Label Type field 406 indicates the priority of the Flagged Set object.

Alternatively, rather than using separate Flagged Set objects, one or more currently unused fields of the Label Set object could be used to designate the object as either a Label Set or a Flagged Set object, as well as to indicate the relative priorities of multiple Flagged Set objects.

Each downstream node may change, or update, the set (i.e., Label Set or Flagged Set) to which any wavelength is assigned unidirectionally in decreasing order of priority; for example, a wavelength can be moved from the Label Set (higher priority) to a Flagged Set (lower priority), but not from a Flagged Set (lower priority) to the Label Set (higher priority). Similarly, in situations in which multiple Flagged Sets exist, a wavelength can be moved from a higher priority Flagged Set (e.g., Flagged Set-1) to a lower priority Flagged Set (e.g., Flagged Set-2), but not vice versa.

Figure 5A:
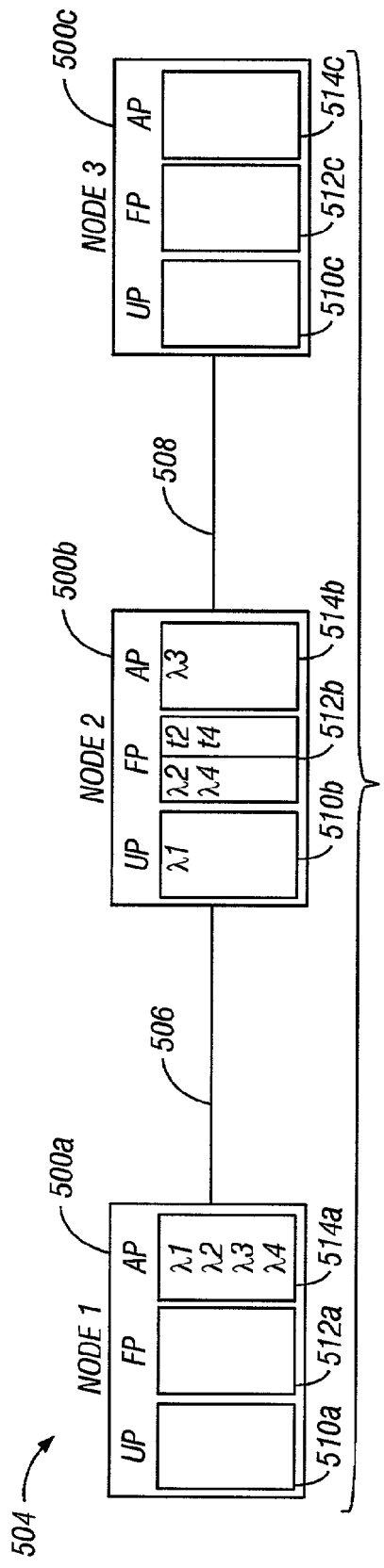
FIGS. 5A–5C collectively illustrate an exemplary application of one embodiment of the present invention.
Figure 5B:
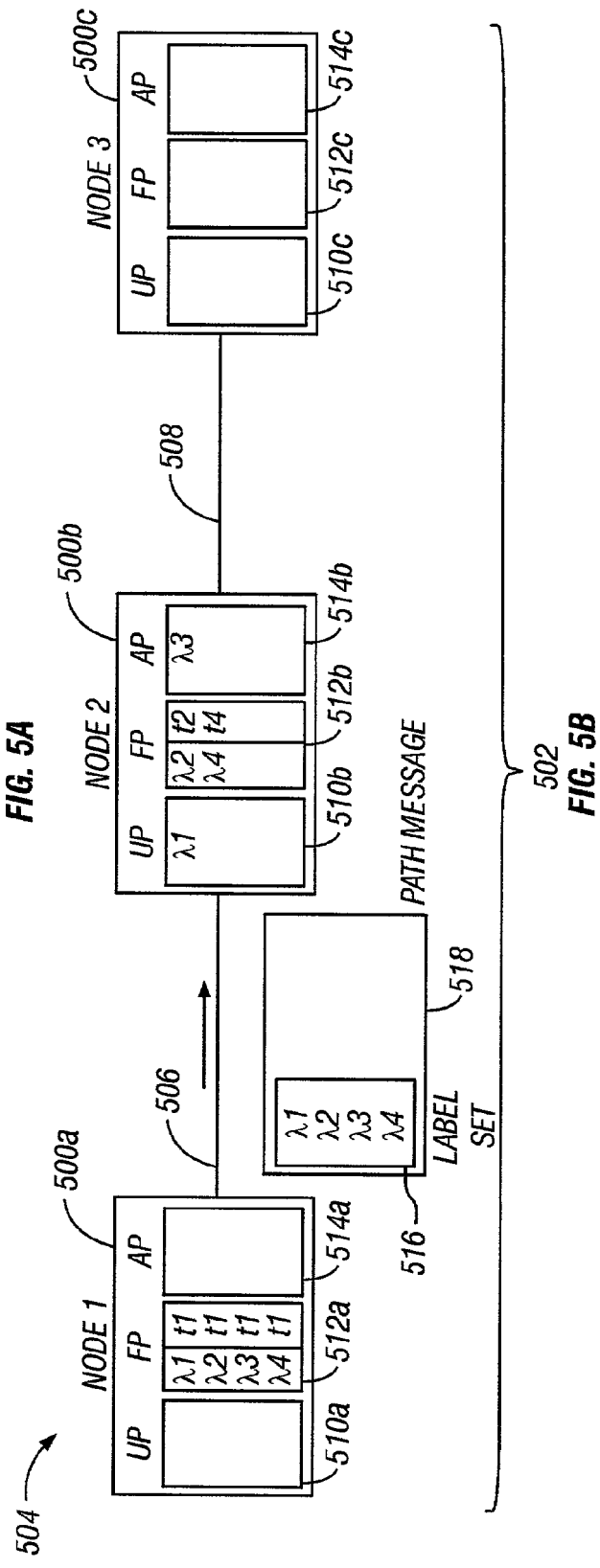
Figure 5C:
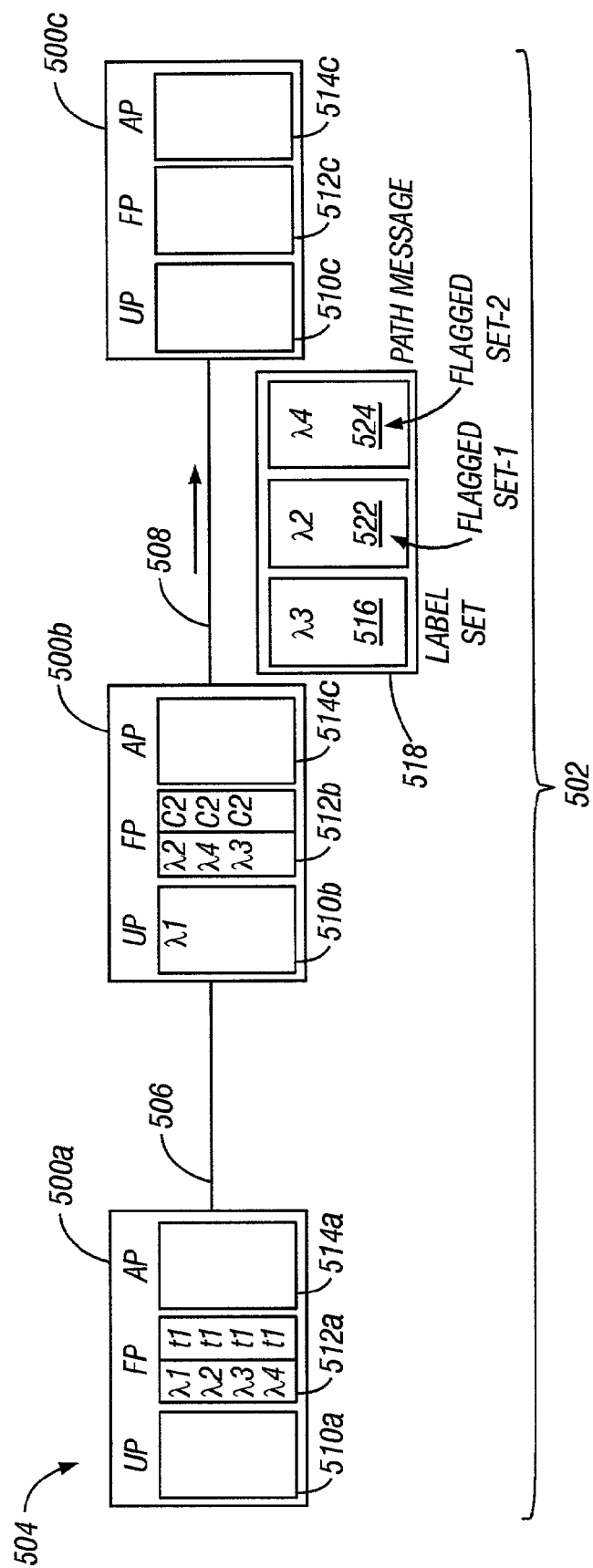

FIGS. 5A–5C collectively illustrate an example of the teachings described hereinabove. The example will be described with reference to three nodes 500a, 500b, and 500c, along a path 502 in an optical network 504. Node 500a is the ingress, or source, node and node 500c is the egress, or destination, node. Nodes 500a and 500b are connected by a first link 506; nodes 500b and 500c are connected by a second link 508. Each link 506, 508, has four wavelengths λ1, λ2, λ3, and λ4. Each node 500a, 500b, 500c, includes a UP 510a, 510b, 510c, respectively, an FP 512a, 512b, 512c, respectively, and an AP 514a, 514b, 514c, respectively. It will be assumed for the sake of example that two Flagged Sets have been established, wherein a first Flagged Set ("FS0") includes the wavelengths for which CT−$TS_\lambda$ is between 2.0 seconds and 1.0 seconds and a second Flagged Set ("FS1") includes the wavelengths for which CT−$TS_\lambda$ is between 1.0 seconds and 0.0 seconds.

Referring to FIG. 5A, initially, all of the wavelengths at the node 500a are in the AP 514a. At the node 500b, the wavelength λ1 is already in use and hence is in the UP 510b. Wavelengths λ2 and λ4 have been suggested to different LSPs at local time stamps t2 and t4, respectively, and hence are in the FP 512b. Wavelength λ3 is available and hence is in the AP 514b. Moving on to FIG. 5B, the node 500a places all four wavelengths λ1–λ4 into a Label Set 516 of a Label Request, in this case, a Path message 518, in order to set up the light path, and moves all of the wavelengths λ1–λ4 from the AP 514a to the FP 512a with a time stamp of t1, which indicates the local clock time at the time the wavelengths are placed in the Label Set. The Path message 518 is sent along the link 506 to the node 500b.

Referring now to FIG. 5C, it will be assumed that the local clock time at the node 500b upon the arrival of the Path message 518 is c2. An OSC (not shown) at the node 500b takes the following actions. First, since $\lambda 1$ is in the UP 510b, it is extracted from the Label Set 516. For the wavelength $\lambda 2$, if $1.0<(c2-t2)<2.0$, a Flagged Set-1 object 522 is created and the wavelength $\lambda 2$ is moved from the Label Set object 516 to the Flagged Set-1 object 522. On the other hand, if $0.0<(c2-t2)<1.0$, a Flagged Set-2 object 524 is created and the wavelength $\lambda 2$ is moved from the Label Set object 516 to the Flagged Set-2 object 524. It will be assumed for the sake of example that $1.0<(c2-t2)<2.0$, so the wavelength $\lambda 2$ is moved from the Label Set object 516 to the Flagged Set-1 object 522.

Since the wavelength $\lambda 3$ is in the AP 514b, it is retained in the Label Set 516. With respect to the wavelength $\lambda 4$, if $1.0<(c2-t4)<2.0$, then the wavelength $\lambda 4$ is moved from the Label Set object 516 to the Flagged Set-1 object 522; however, if $0.0<(c2-t4)<1.0$, then the wavelength $\lambda 4$ is moved from the Label Set object 516 to the Flagged Set-2 object 524. It will be assumed that $0.0<(c2-t4)<1.0$, so the wavelength $\lambda 4$ is moved to the Flagged Set-2 object 524.

The updated Path message 518 is then forwarded to the egress node 500c, which selects the wavelength $\lambda 3$ from the Label Set object 516 for the LSP. If the Label Set 516 had been empty, the node 500c would have selected a wavelength from the Flagged Set-1 object 522. Similarly, if the both the Label Set object 516 and Flagged Set-1 object 522 had been empty, the node 500c would have selected a wavelength from the Flagged Set-2 object 524. It will be noted that if all of the objects 516, 522, and 524 were empty, an error message would be generated in the usual fashion.

Under current GMPLS standards, all three of the wavelengths $\lambda 2$, $\lambda 3$, and $\lambda 4$ would be included in the Label Set object 516 and the node 500c would select one of these wavelengths. In contrast, the embodiments described herein take into account the fact that the wavelength $\lambda 3$, having not been recently suggested for use in another LSP along the path, is a preferable choice to the wavelengths $\lambda 2$ and $\lambda 4$, both of which have been more recently suggested than the wavelength $\lambda 3$. Similarly, the wavelength $\lambda 2$ is a preferable choice to $\lambda 4$ due to the fact that the wavelength $\lambda 4$ has been more recently suggested than the wavelength $\lambda 2$.

Based upon the foregoing Detailed Description, it should be readily apparent that the present invention advantageously provides an innovative and efficient solution for facilitating fair and effective lightpath reservation in a GMPLS network. In particular, without requiring global timing, global time stamps, or node synchronization, using just local node clocks and local time stamps, the invention provides a global label prioritization method that decreases the occurrence of wavelength collision in a GMPLS network.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A method of implementing an optical switch controller ("OSC") at a node of an optical network, the method comprising the steps of:

responsive to receipt at the node of a Label Request message identifying a Label Set comprising a plurality of wavelengths, for each wavelength of the Label Set:
  determining whether the wavelength is an element of an Available Pool ("AP") of the OSC;
  responsive to a determination that the wavelength is not an element of the AP, determining whether the wavelength is an element of a Flagged Pool ("FP") of the OSC;
  responsive to a determination that the wavelength is not an element of the FP, updating the Label Request message by removing the wavelength from the Label Set;
  responsive to a determination that the wavelength is an element of the FP, determining whether a local clock time at the node minus a time stamp associated with the wavelength in the FP is less than a short threshold;
  responsive to a determination that the local clock time at the node minus the time stamp associated with the wavelength is shorter than a short threshold, updating the Label Request message by removing the wavelength from the Label Set; and
  responsive to a determination that the local clock time at the node minus the time stamp associated with the wavelength is not shorter than a short threshold, updating the Label Request message by removing the wavelength from the Label Set and including the wavelength in a Flagged Set identified in the Label Request message.

2. The method of claim 1 further comprising the step of forwarding the updated Label Request message to a downstream node.

3. The method of claim 1 wherein the optical network is a Generalized Multi-Protocol Label Switching ("GMPLS") network.

4. The method of claim 1 further comprising the steps of:
identifying in the Label Request message more than one Flagged Sets;
assigning a different time interval to each of the Flagged Sets.

5. The method of claim 4 further comprising the steps of, for each wavelength in the Label Set:
determining whether the current clock time at the node minus the time stamp associated with the wavelength falls within the time interval assigned to one of the Flagged Sets; and
responsive to a determination that the current clock time at the node minus the time stamp associated with the wavelength falls within the time interval assigned to one of the Flagged Sets, updating the Label Request message by removing the wavelength from the Label Set and including the wavelength in the one of the Flagged Sets.

6. The method of claim 4 wherein the Flagged Sets are prioritized such that a highest priority Flagged Set includes wavelengths for which a current clock time at the node minus the time stamp associated with the wavelength is closer to an expiration threshold tan to zero and a lowest priority Flagged Set includes wavelengths for which a current clock time at the node minus the time stamp associated with the wavelength is closer to zero tan to an expiration threshold.

7. The method of claim 6 further comprising the steps of, for each wavelength in each one of the Flagged Sets:

determining whether the current clock time at the node minus the time stamp associated with the wavelength falls within the time interval assigned to a lower priority Flagged Set; and responsive to a determination that the current clock time at the node minus the time stamp associated with the wavelength falls within the time interval assigned to a lower priority Flagged Set, updating the Label Request message by removing the wavelength from the one of the Flagged Sets and including the wavelength in the lower priority Flagged Set.

8. The method of claim 6 further comprising the steps of, for each wavelength in each one of the Flagged Sets:

determining whether the wavelength is an element of the UP of the node; and if the wavelength is an element of the UP of the node, removing the wavelength from the Flagged Set.

9. The method of claim 1 further comprising the step of, for each wavelength, responsive to the current clock time at the node minus the time stamp associated with the wavelength being equal to an expiration threshold, removing the wavelength from the FP and including the wavelength in the AP.

10. The method of claim 1 wherein the UP comprises a database table that lists wavelengths in current use for existing optical paths through the node, the FP comprises a database table that lists wavelengths proposed for new optical paths to be established through the node, and the AP comprises a database table that lists wavelengths that are elements of neither the UP nor the FP.

11. An optical switch controller ("OSC") in a first node of an optical network comprising:

a Used Pool ("UP") comprising a list of wavelengths currently in use for existing optical paths through the node;

a Flagged Pool ("FP") identifying wavelengths which have been suggested to second node for a new optical paths to be established through the first node but which have not yet been reserved for the path, and including for each identified wavelength a time stamp indicating when the wavelength was suggested;

an Available Pool ("AP") identifying wavelengths that are not elements of the UP or the FP; and means for making an additional wavelength suggestion, including determining from the time stamp of a particular wavelength in the FP pool, how recently the particular wavelength has been suggested, so as to reduce the incidence of suggesting a wavelength for multiple paths.

12. An optical switch controller ("OSC") in a node of an optical network comprising:

a Used Pool ("UP") comprising a list of wavelengths currently in use for existing optical paths through the node;

a Flagged Pool ("FP") identifying wavelengths proposed for new optical paths to be established through the node and including for each identified wavelength a time stamp indicating when the wavelength was proposed; and an Available Pool ("AP") identifying wavelengths that are not elements of the UP or the FP, wherein responsive to receipt at the node of a Label Request message identifying a Label Set comprising a plurality of wavelengths, for each wavelength of the Label Set, the OSC:

updates the Label Request message by removing the wavelength from the Label Set if the wavelength is an element of the UP of the node;

updates the Label Request message by removing the wavelength from the Label Set and including the wavelength in a Flagged Set identified in the Label Request message if the wavelength is an element of the FP of the node and the local clock time at the node minus the time stamp associated with the wavelength is not shorter than a short threshold; and updates the Label Request message by removing the wavelength from the Label Set if the wavelength is an element of the FP of the node and the local clock time at the node minus the time stamp associated with the wavelength is shorter than a short threshold.

13. An optical switch controller ("OSC") at a node of an optical network comprising:

means responsive to receipt at the node of a Label Request message identifying a Label Set for determining whether a wavelength of the Label Set is an element of an Available Pool ("AP") of the OSC;

means responsive to a determination that the wavelength is not an element of the AP for determining whether the wavelength is an element of a Flagged Pool ("FP") of the OSC;

means responsive to a determination that the wavelength is not an element of the FP for updating the Label Request message by removing the wavelength from the Label Set;

means responsive to a determination that the wavelength is an element of the FP for determining whether a local clock time at the node minus a time stamp associated with the wavelength in the FP is less than a short threshold;

means responsive to a determination that the local clock time at the node minus the time stamp associated with the wavelength is shorter than a short threshold for updating the Label Request message by removing the wavelength from the Label Set; and means responsive to a determination that the local clock time at the node minus the time stamp associated with the wavelength is not shorter than a short threshold for updating the Label Request message by removing the wavelength from the Label Set and including the wavelength in a Flagged Set identified in the Label Request message.

14. The OSC of claim 13 further comprising means for forwarding the updated Label Request message to a downstream node.

15. The OSC of claim 13 wherein the optical network is a Generalized Multi-Protocol Label Switching ("GMPLS") network.

16. The OSC of claim 13 further comprising:

means for identifying in the Label Request message more than one Flagged Sets; and means for assigning a different time interval to each of the Flagged Sets.

17. The OSC of claim 16 further comprising:

means for determining whether the current clock time at the node minus the time stamp associated with the wavelength falls within the time interval assigned to one of the Flagged Sets; and means responsive to a determination that the current clock time at the node minus the time stamp associated with the wavelength falls within the time interval assigned to one of the Flagged Sets for updating the Label Request message by removing the wavelength from the Label Set and including the wavelength in the one of the Flagged Sets.

18. The OSC of claim 17 wherein the Flagged Sets are prioritized such that a highest priority Flagged Set includes wavelengths for which a current clock time at the node minus the time stamp associated with the wavelength is closer to an expiration threshold than to zero and a lowest priority Flagged Set includes wavelengths for which a current clock time at the node minus the time stamp associated with the wavelength is closer to zero than to an expiration threshold.

19. The OSC of claim 18 further comprising:
means for determining whether the current clock time at the node minus the time stamp associated with a wavelength of a first Flagged Set falls within the time interval assigned to a lower priority Flagged Set; and
means responsive to a determination that the current clock time at the node minus the time stamp associated with the wavelength of the first Flagged Set falls within the time interval assigned to a lower priority Flagged Set for updating the Label Request message by removing the wavelength from the one of the Flagged Sets and including the wavelength in the lower priority Flagged Set.

20. The OSC of claim 18 further comprising:
means for determining whether a wavelength of a first Flagged Set is an element of the UP of the node; and
means for removing the wavelength from the first Flagged Set if the wavelength of the first Flagged Set is an element of the UP of the node.

21. The OSC of claim 13 further comprising means responsive to the current clock time at the node minus the time stamp associated with the wavelength being equal to an expiration threshold for removing the wavelength from the FP and including the wavelength in the AP.

22. The OSC of claim 13 wherein the UP comprises a database table that lists wavelengths in current use for existing optical paths through the node, the FP comprises a database table that lists wavelengths proposed for new optical paths to be established through the node, and the AP comprises a database table that lists wavelengths that are elements of neither the UP nor the FP.

* * * * *